(12) United States Patent
Janczak et al.

(10) Patent No.: US 7,856,465 B2
(45) Date of Patent: Dec. 21, 2010

(54) COMBINED FAST FOURIER TRANSFORMS AND MATRIX OPERATIONS

(75) Inventors: Tomasz Janczak, Gdansk (PL); Wieslaw Wisniewski, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 1034 days.

(21) Appl. No.: 11/643,165

(22) Filed: Dec. 21, 2006

(65) Prior Publication Data

US 2008/0155002 A1 Jun. 26, 2008

(51) Int. Cl.
 *G06F 17/14* (2006.01)

(52) U.S. Cl. ..................................... 708/404
(58) Field of Classification Search ............... None
 See application file for complete search history.

(56) References Cited

U.S. PATENT DOCUMENTS

| | | | |
|---|---|---|---|
| 6,282,583 B1 * | 8/2001 | Pincus et al. ................ | 713/375 |
| 7,082,451 B2 * | 7/2006 | Kulkarni et al. ............. | 708/404 |
| 2004/0064493 A1 * | 4/2004 | Kulkarni et al. ............. | 708/404 |
| 2009/0106341 A1 * | 4/2009 | Al Adnani .................. | 708/404 |

* cited by examiner

*Primary Examiner*—David H Malzahn
(74) *Attorney, Agent, or Firm*—Lee & Hayes, PLLC

(57) ABSTRACT

Embodiments of a hardware accelerator having a circuit configurable to perform a plurality of matrix operations and Fast Fourier Transforms (FFT) are presented herein.

18 Claims, 12 Drawing Sheets

COMBINED FAST FOURIER TRANSFORMS AND MATRIX OPERATIONS

BACKGROUND

Complex mathematical computing may be used in the signal processing of wireless signals, as well as for processing of a variety of other data streams. For instance, complex multipliers may be used to perform operations on samples of an incoming wireless data stream received at a wireless device, such as for time/frequency domain transforms, signal equalization, signal detection and combining, beamforming, filtering of the data, and so forth. Such complex multipliers may also be employed in graphics processing applications. Traditionally, many multipliers (e.g., tens or hundreds of multipliers) are used in parallel for fast computations; however such parallel multiplier arrangements may use relatively large die space (e.g., large chip and/or silicon area) and may have high power consumption. Further, traditional arrangements of complex multipliers may be limited to a single fixed calculation and are typically provided as devices which are separate from hardware accelerators which perform Fast Fourier Transforms (FFT) (e.g., not included in the same die, module, or circuit), which may further increase the power and space used to perform the complex mathematical computing operations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

In the following discussion, an exemplary environment is first described that is operable to perform signal processing via a hardware accelerator which is configurable to perform a variety of Fast Fourier Transforms (FFT) and matrix operations. Exemplary devices and procedures are then described that may be employed in the exemplary environment, as well as in other environments.

Exemplary Environment

Figure 1:
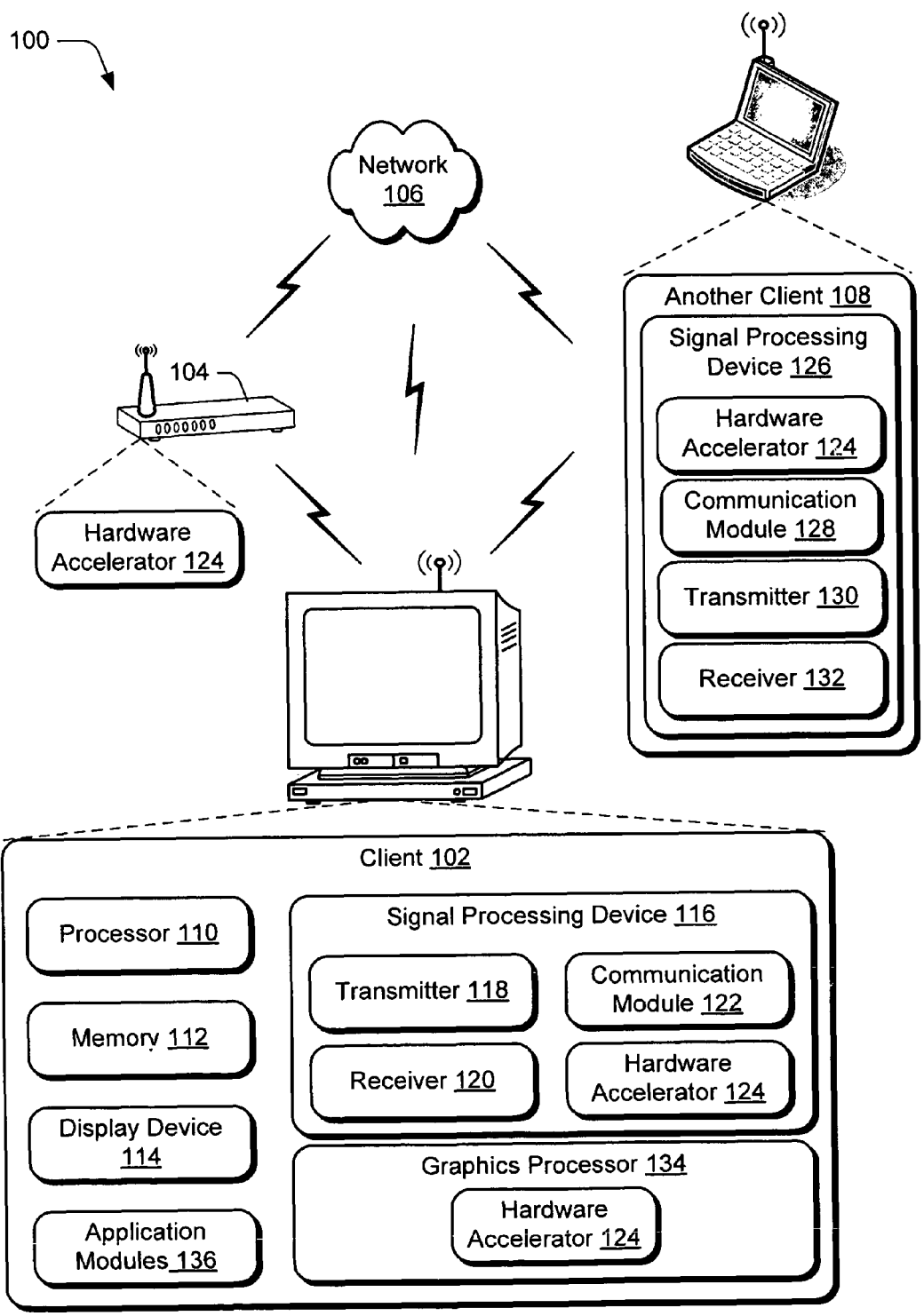
FIG. 1 is an illustration of an environment in an exemplary implementation that is operable to employ hardware accelerators which combine Fast Fourier Transform (FFT) and matrix operations.

FIG. 1 is an illustration of an environment 100 in an exemplary implementation that is operable to employ hardware accelerators which combine Fast Fourier Transform (FFT) and matrix operations. The illustrated environment 100 includes a client 102 that is communicatively coupled to a base station 104 that is configured to provide network 106 access, and to another client 108. The clients 102, 108 may be configured in a variety of ways, such as a traditional desktop computer as illustrated for client 102, a laptop as illustrated for the other client 108, a wireless phone, a game console, a hand-held computing device, a set-top box, a personal digital assistant, a gaming appliance, a multi-media playback device, a digital video recording device, and so on. The client 102, in portions of the following discussion, may also relate to a person and/or entity that operate the client. In other words, the clients 102, 108 may describe logical clients that include users, software, and/or devices. In an implementation, one or more of the a clients 102, 108 client may represent a content provider, such as an email provider, internet provider, broadcaster, and/or cellular provider which is configured to provided resources (e.g., a variety of content and services) to subscribers (e.g., to other clients) via the network 106.

The base station 104, by way of example and not limitation, may be configured as a router, an internet gateway, a cellular tower, a broadcast tower, or other access point suitable to provide a connection to the network 106. Accordingly, the network 106 may be configured in a variety of ways such as including the Internet, a wide area network (WAN), a local area network (LAN), a wireless network, a public telephone network, a cellular network, a broadcast network, an intranet, and so on. Further, although a single network 106 is shown, the network 106 may be configured to include multiple networks.

The client 102 as illustrated includes a processor 110, memory 112, a display device 114 and a signal processing device 116. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Although a single memory 112 is shown, a wide variety of types and combinations of memory may be employed, such as random access memory (RAM), hard disk memory, removable medium memory, and other types of computer-readable media. Further, although a display device 114 illustrated as a monitor (e.g., a liquid crystal display device) is shown, the display device 114 may assume a variety of configurations to output data.

The signal processing device 116 is configured to provide communication through use of a transmitter 118, receiver 120 and a communication module 122. In an implementation, signal processing device 116 may be configured as a network interface device which provides the client 102 with a connection to the network 106. For example, the signal processing device 116 may be configured to be included in a variety of systems, such as a single or multi-antenna system that may include a variety of types of antennas (for example, smart antennas) to provide a wireless connection to the network 106, which may be direct or via the base station 104. For instance, a receiver 120 may be configured to receive wireless data via one or more antennas which are included with the receiver 120, the signal processing device 116, and/or the client 102. Additionally or alternatively, the signal processing device 116 may be configured to provide a wired connection, for instance via an Ethernet port, universal serial bus (USB) port, and so forth. The communication module 122 is representative of functionality that is usable to manage communication performed by the signal processing device 116. For example, the communication module 122 may function to form signals and/or packets to be transmitted by the transmitter 118 and to process signals and/or packets received by the receiver 120.

In an implementation, the signal processing device 116 is configured to include a hardware accelerator 124 which may perform various operations to process the signals, such as performing complex mathematical operations to process wireless data signals which are received from and sent to the base station 104. For instance, hardware accelerator 124 may process data and/or samples of data which are received via the receiver 120. As the name suggests, hardware accelerator 124 may be configured to increase the speed of signal processing through application of a variety the complex mathematical operations and algorithms. In an implementation, the hardware accelerator 124 is configurable to provide a variety of functionality for complex computations in digital signal processing, including complex matrix operations and Fast Fourier Transforms (FFT), further discussion of which may be found in relation to FIGS. 2-12. While illustrated separately, in an implementation the hardware accelerator 124 may be incorporated with the communication module 122.

When configured to provide a network interface device, the signal processing device 116, may form a wireless connection with the other client 108. The client 108 is illustrated as having a signal processing device 126 which may also be configured as a network interface device. The signal processing device 126 of client 108 is further depicted as having a respective hardware accelerator 124, a communication module 128, a transmitter 130, and a receiver 132. The connection between the clients 102, 108 may occur via the network 106, via the base station 104, or may be a peer-to-peer wireless connection. Therefore, the client 102 and the other client 108 may communicate back and forth through use of the respective signal processing devices 116, 126 which may be configured in accordance with a variety of protocols and standards, examples of which are Institute of Electrical and Electronics Engineers (IEEE) 802.11 ("WiFi") and 802.16 ("WiMax") standards, and the Third Generation Partnership Project (3GPP) Long Term Evolution (LTE) projeect for development of next generation Universal Mobile Telecommunications System (UMTS) standards. While examples of wireless connections have been described, it is noted that wired connections between clients 102, 108 may also be employed, for example, via an Ethernet, fiber optic, or serial cable. Further, it is contemplated that a hardware accelerator 124 may be incorporated in a variety of devices other than the illustrated signal processing devices 116, 126. For instance, the base station 104 may also include a respective hardware accelerator 124 for processing of signals from the network 106 and/or clients 102, 108. Further, a hardware accelerator 124 may be provided for various internal data processing tasks of a client 102, one example of which is a hardware accelerator 124 which is included with a graphics processor 134. Graphics processor 134 may provide functionality to compress/decompress data and/or render data on the display device 114 from one or more application module 136 which may be stored in memory 112 and may also be executed on processor 110 of the client 102. A variety of other examples of signal processing devices 116 which may include a hardware accelerator 124 are also contemplated.

Figure 2:
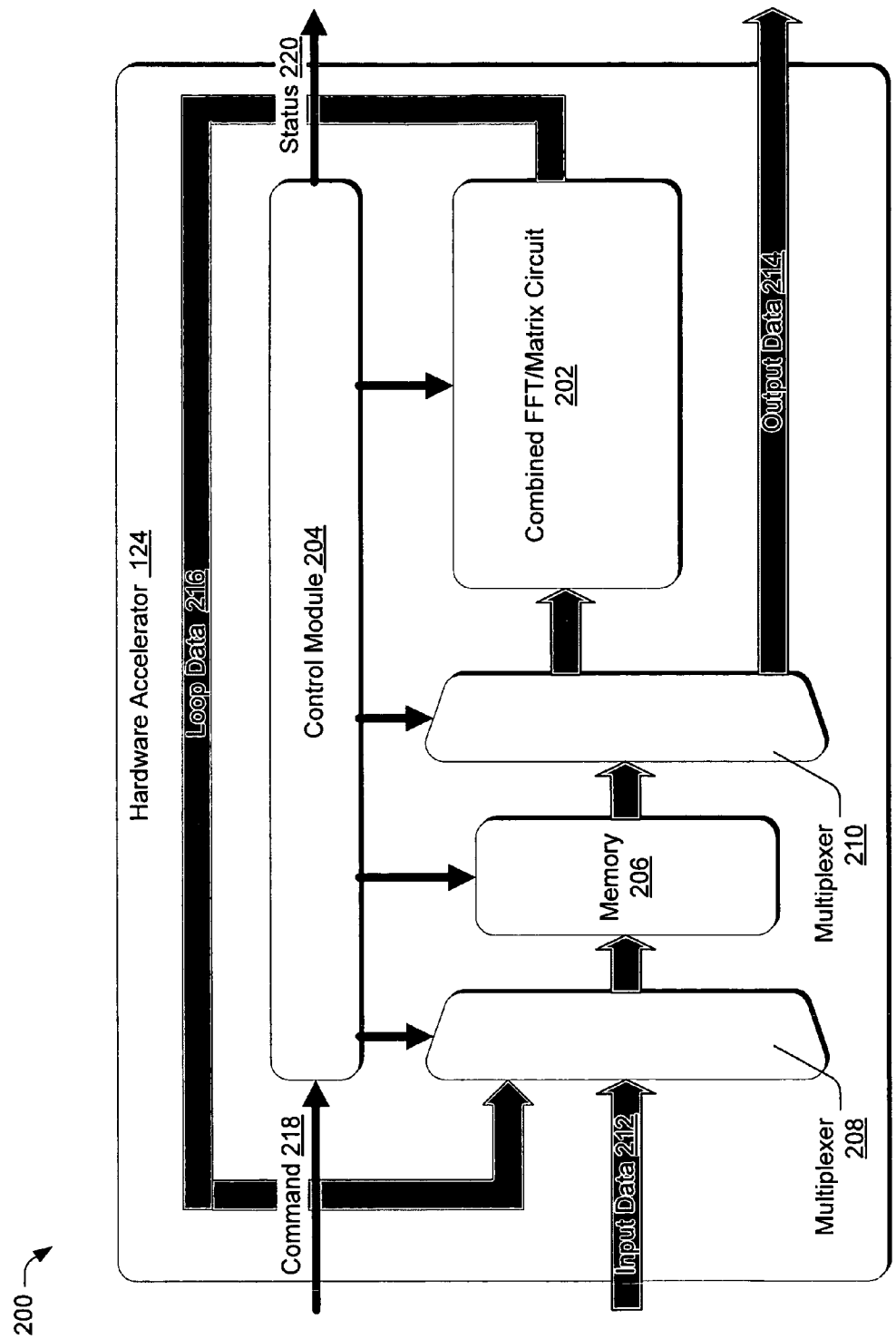
FIG. 2 is an illustration of exemplary hardware accelerator which may include a combined FFT/Matrix circuit configured in accordance with one or more embodiments.

FIG. 2 depicts an exemplary implementation 200 of a hardware accelerator 124 which may be configured to employ combined FFT and matrix operations. The hardware accelerator 124 includes a combined Fast Fourier Transform (FFT) and matrix operations circuit 202 (hereinafter "combined FFT/Matrix circuit 202") and a control module 204. The combined FFT/Matrix circuit 202 may be configured in a variety of ways to perform a variety of complex computations, examples of which are discussed in reference to FIGS. 3-11. The hardware accelerator 124 further includes a memory 206, an input multiplexer 208 and an output multiplexer 210. FIG. 2 further depicts examples of signals lines for input data 212, output data 214 and loop data 216. Control module 204 is further illustrated as receiving command 218 signals and may also generate status 220 signals.

Control module 204 represents functionality to control the operation of the hardware accelerator 124, selection of the algorithm performed via the hardware accelerator 124 (e.g., which particular complex computations is performed), execution of the computations, configuration of the hardware accelerator 124 and/or combined FFT/Matrix circuit 202, and so forth. Thus, control module 204 is operable to select a variety of configurations of the combined FFT/Matrix circuit 202 corresponding to different complex computations. Control module 204 may also address memory 206 to store arguments, and manage operations of the multiplexers 208, 210 to read/write arguments to/from the appropriate locations in memory and/or to provide the arguments to the correct device and/or data stream. Control module 204 provides functionally by which the combined FFT/Matrix circuit 202 may be configured and reconfigured to perform a variety of different computations, examples of which are discussed with respect to FIGS. 4 to 11. Control Module 204 may be implemented in hardware, such as a microsequencer that reads microcode from associated read-only memory (ROM), a state machine, a microprocessor, and so on. Control Module 204 may also implemented as software executed via a processor associated with the hardware accelerator 124, such as an associated signal processing device 116 which for the purposes of example may be implemented as a network interface device through which the client 102 of FIG. 1 may be connected to the network 106. Further, the control module 204 may be implemented via software (e.g., a software driver) which is executable on a processor, for example processor 110 of the client 102. A variety of other examples are also contemplated.

In operation, input data 212 may be provided to the hardware accelerator 124 which is processed to form output data 214. The input multiplexer 208 is to selectively route arguments from the input 212 and loop 216 to the appropriate memory 206 locations, such as those addresses defined and specified via control module 204. The output multiplexer 210 is to selectively route arguments from the memory 206 to the combined FFT/matrix circuit 202 and/or output 214, which again may be directed via the control module 204. The memory 206 stores intermediate data. The memory 206 may also store configuration data for use in certain operations, such as twiddle factors used in FFT performed via the combined FFT/Matrix circuit 202. The memory 206 may be implemented as random access memory (RAM) including static random access memory (SRAM) and/or dynamic random access memory (DRAM). Alternatively, memory 206 may be implemented as flash memory or other suitable memory. Naturally, memory 206 may represent a variety of different combinations and types of memory.

Control module 204 may receive a variety of commands via command 218 signals. The commands may be associated with particular input data 212 and indicate the type of data, a selection of one or more computations which are to be performed on the data, an indication of the requesting device, indication where results are to be communicated, and so forth. Control module 204 may thus control the sequence of operations for the hardware accelerator including: obtaining the data, determining which operation(s) to perform, controlling the sequence and timing of multiple events and operations, setting the combined FFT/matrix circuit 202 to perform one or more selected computation, and so on. Control module 204 may also included functionality to provide feedback, via status 220 signals such as completions, errors, status (e.g., waiting, percent complete) and other message related to performance of operation via the hardware accelerator 124.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU, CPUs, a processor of a network connection device 116, and so on). The program code can be stored in one or more computer readable memory devices, e.g., memory within the signal processing device 116. Thus, although the processor 110 and memory 112 are illustrated as "outside" the signal processing device 116, the processor 110 and memory 112 and even display device 114 (e.g., implemented as indication lights) may be incorporated within the signal processing device 116. The features of the described combined FFT/matrix techniques are platform-independent, meaning that the techniques may be implemented on a variety of commercial computing platforms having a variety of processors.

Figure 3:
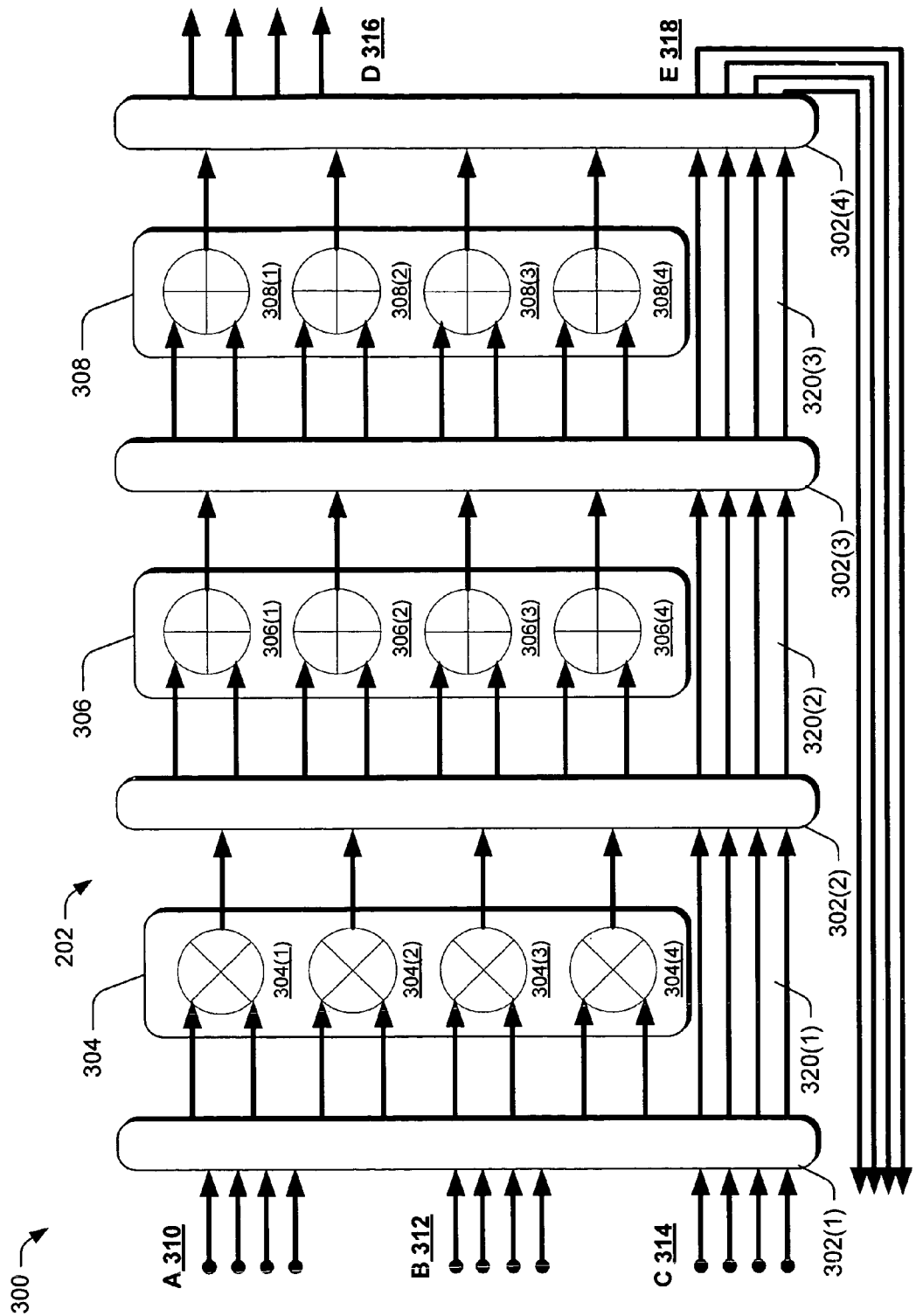
FIG. 3 is illustration depicting an exemplary implementation of a combined FFT/Matrix circuit of FIG. 2 in greater detail.

FIG. 3 depicts an exemplary implementation 300 of a combined FFT/Matrix circuit 202 of FIG. 2 in greater detail. The combined FFT/Matrix circuit 202 may include a plurality of multiplexers 302(1)-302(4) which are to direct data signals and arguments to/from a plurality of computation stages which are to perform a plurality of complex computations on the data. In the illustrated example, the computation stages include a multiplier portion 304, and one or more addition portions 306, 308. The multiplier portion 304 provides a set of complex multipliers, which as depicted has four multipliers 304(1)-304(4). Likewise, each of the depicted addition portions 306, 308 provides a set of complex adders, which in the depicted example have four adders each, e.g., adders 306(1)-306(4) and 308(1)-308(4) respectively. Thus, the depicted example includes four complex multipliers and eight complex adders. Four real multipliers may be used to implement a complex multiplier Combined FFT/Matrix circuit 202 also includes 3 sets of Inputs "A" 310, "B" 312, and "C" 314, each of which may include 4 individual inputs. Each individual input corresponds to one complex number. Thus, the 3 sets of inputs 310, 312, and 314 include a total of 12 individual inputs for complex numbers. A set of outputs "D" 316 is depicted which may include 4 individual output again each of which corresponds to one complex number.

Multiplexer 302(4) may selectively route arguments between the set of outputs "D" 316 and a set of looped outputs "E" 318 which are "looped back" to the set of inputs "C" 314 to allow iterative calculations, cumulative multiply-add operations, and so forth. Thus, the looped outputs "E" 318 may permit a variety of multi-pass calculations via the combined FFT/Matrix circuit 202.

As illustrated in FIG. 3, the complex multipliers 304(1)-304(4) and complex adders 306(1)-306(4), 308(1)-308(4) are provided via three computation stages which are the multiplier portion 304, adder portion 306, and adder portion 308. Each of these computation stages includes a respective bypass portion 320(1), 320(2), 320(3) by which the particular operations of the stage may be bypassed. The multiplexers 302(1)-302(3) are arranged between the stages. The input multiplexer 302(1) is to select arguments for calculation. The proxy multiplexers 302(2), 302(3) are to select intermediate results for further calculation, e.g., to direct the outputs of the first two stages. Output multiplexer 302(4) may then select the results for output via outputs "D" 316 and or to be looped back via loop outputs "E" data for successive iterations. In an implementation, the control module 204 of FIG. 2 may control the multiplexers 302(1)-302(4) to set the combined FFT/Matrix circuit 202 for a selected computation, and to direct the input data through the combined FFT/Matrix circuit 202 to perform the computation.

The depicted implementation in FIG. 3 of a combined FFT/Matrix circuit 202 having three computation stages, 304, 306, 308, four complex multipliers 304(1)-304(4), eight complex adders 306(1)-306(4), 308(1)-308(4), and four multiplexers 302(1)-302(4) to direct arguments (e.g., inputs and outputs), provides a favorable balance between the size of the combined FFT/Matrix circuit 202, the speed of the computations performed, and the number of iterations used. In this arrangement, a relatively small silicon area or die space may be used for the depicted implementation 300, while allowing the flexibility for performance via the single combined FFT/Matrix circuit 202 of numerous different computations which may be performed efficiently and with a relatively high speed and/or low number of iterations. For instance, multipliers may take up a large percentage of the die space, such as 80%. Thus, it is efficient to select a number of multipliers such that the each of the multipliers is put to use in most operations/configurations. Thus, the four multipliers 304(1)-304(4) in the selected arrangement in FIG. 3 may be in use for nearly all of the computations performed by the combined FFT/Matrix circuit 202. Naturally, in one or more alternative embodiments a combined FFT/Matrix circuit 202 may include additional stages, multipliers, adders, and so forth to provide even greater speed, in particular where a larger sized circuit is deemed acceptable. Further, stages, multipliers, adders, and so forth may be omitted in other embodiments of a combined FFT/Matrix circuit 202 to provide a smaller sized circuit which may perform a selected subset of the plurality of complex computations described herein.

The subsequent discussion demonstrates how the combined FFT/matrix circuit 202 may be configured and reconfigured to perform a variety of complex computations. These may include but are not limited to vector addition of n×1 vectors; parallel scalar multiplication; parallel cumulative multiplication addition operations; vector multiplications including 1×n*n×1 and n×1*1×n multiplication; matrix n×n and vector n×1 multiplication; matrix multiplication; decimation in time radix-2 butterfly computation for FFT; and decimation in time radix-4 butterfly computation for FFT. These and other algorithms which may be used in one or more embodiments of signal processor 116 and/or hardware accelerator 124, such as for wireless signal processing, graphics processing, and so forth are contemplated.

The above computations, for instance, may be performed on a matrix of the form n by n (e.g., n×n) and/or vectors of the form 1 by n or n by 1 (e.g., 1×n or n×1) where "n" may be an integer representing the size of the matrix or vector. The value of "n" may correspond to characteristic of the circuit 202, client 102, and/or other components of the environment 100 in FIG. 1. As an illustrative example, the computations described herein may be utilized in a Software Define Radio (SDR) implementation that use the Orthogonal Frequency Division Multiplexing (OFDM) or Orthogonal Frequency Division Multiplexing Access (OFDMA) modulation techniques, to combined and/or divide wireless data signals. Thus, when "n" is equal 4, this may correspond to four antennas used by the signal processing device 116 and/or client 102 for "beamforming" or MIMO (combining signals). Naturally, a variety of other examples are contemplated, in which various sizes for vectors and matrices may be employed. For, instance, the matrices of the form m×n are also contemplated where "m" and "n" are integers representing the size of the matrix. It is noted that an m×n matrix operation may be reduced to a set of 1×m and/or 1×n operations, such that the techniques herein may be applied to matrices of a variety of sizes.

FIGS. 4-11 each depict an example of a configuration of the combined FFT/matrix circuit 202 to perform a selected computation. The solid lines in FIGS. 4-11 represent connections which are active for the illustrated configurations. The dashed lines represent connections which are deactivated or unused for the particular configurations. Throughout FIGS. 4-11 illustrative signal paths between stages are shown by way of example. Other signal paths are omitted for clarity of the depicted signal paths.

Figure 4:
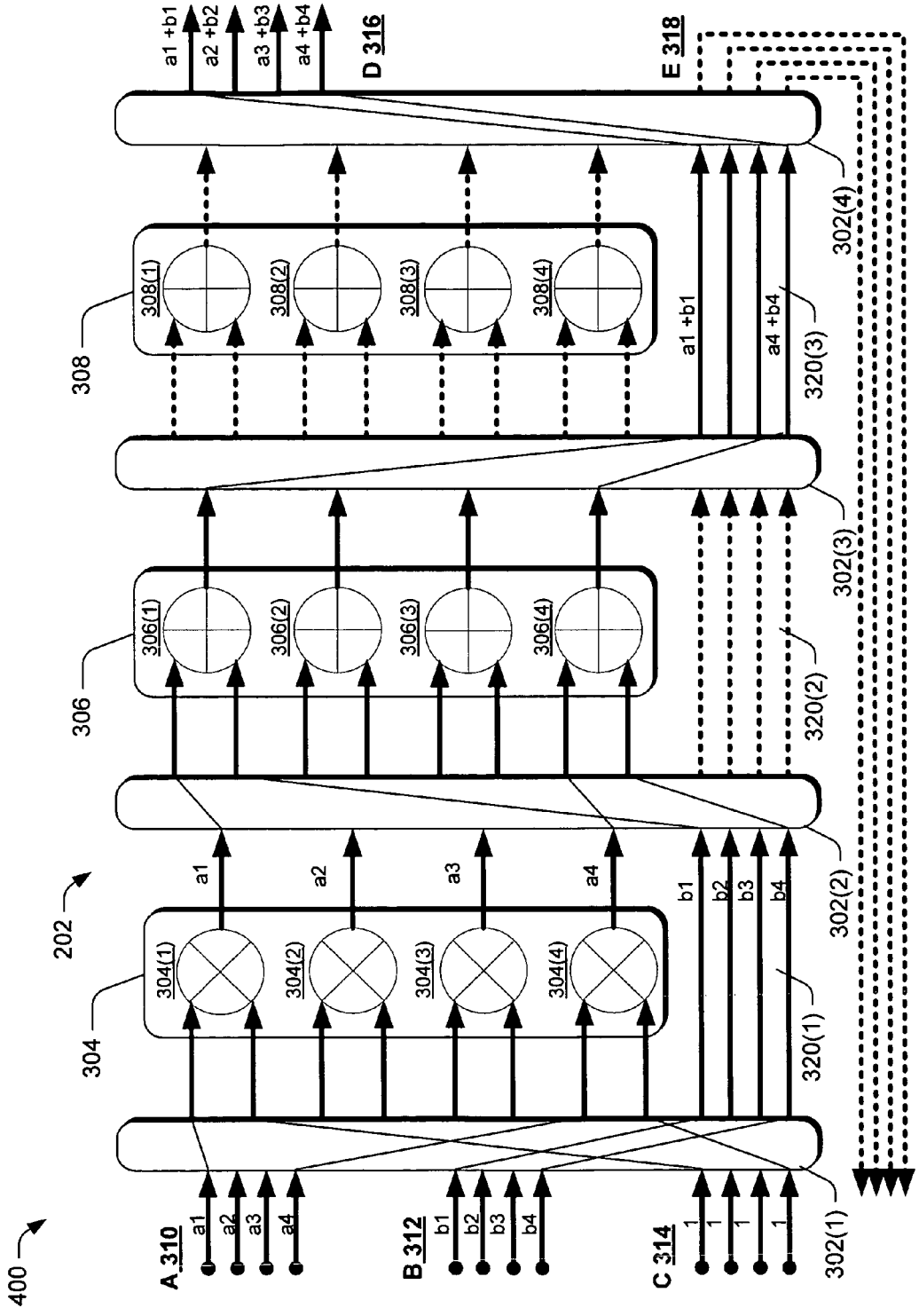
FIGS. 4 to 11 each depict an illustration of an exemplary arrangement of combined FFT/Matrix circuit of FIG. 3 in a configuration to perform a particular complex computation.

FIG. 4 depicts an exemplary configuration of a combined FFT/Matrix 202 to perform a vector addition operation. The operation may be according to the formula:

$$A_{4\times 1} + B_{4\times 1} = \begin{bmatrix} a_1 + b_1 \\ M \\ a_4 + b_4 \end{bmatrix}$$

Inputs "A" 310 and inputs "C" 314 are fed to multiplier portion 304. Inputs "C" 314 are set to 1. Thus the outputs of the multiplier portion 304 are equal to the inputs "A" 310 and are provided to the adder portion 306. Inputs "B" 312 are provided to adder portion 306 via the bypass 320(1) of the multiplier portion 304. A single iteration is used, thus loop outputs "E" 318 are deactivated. Bypass portion 320(2) and adder 308 are also deactivated. The addition is performed via the adder portion 306 and provided via the bypass 320(3) to the output multiplexer 320(4). The outputs "D" 316 thus are a1+b1, a2+b2 . . . and so forth. The configuration, such as which routes, portions, inputs and so forth are used or unused may be managed via the control module 204 as previously described. The vector addition may be used for a variety of calculation such as wireless signal processing including beamforming: input stream combining (e.g., adding data from antennas); MIMO (multiple input multiple output): antenna combining (e.g., adding data from antennas); HARQ (hybrid automatic repeat request) combining (e.g., adding data from retransmitted bursts).

Figure 5:
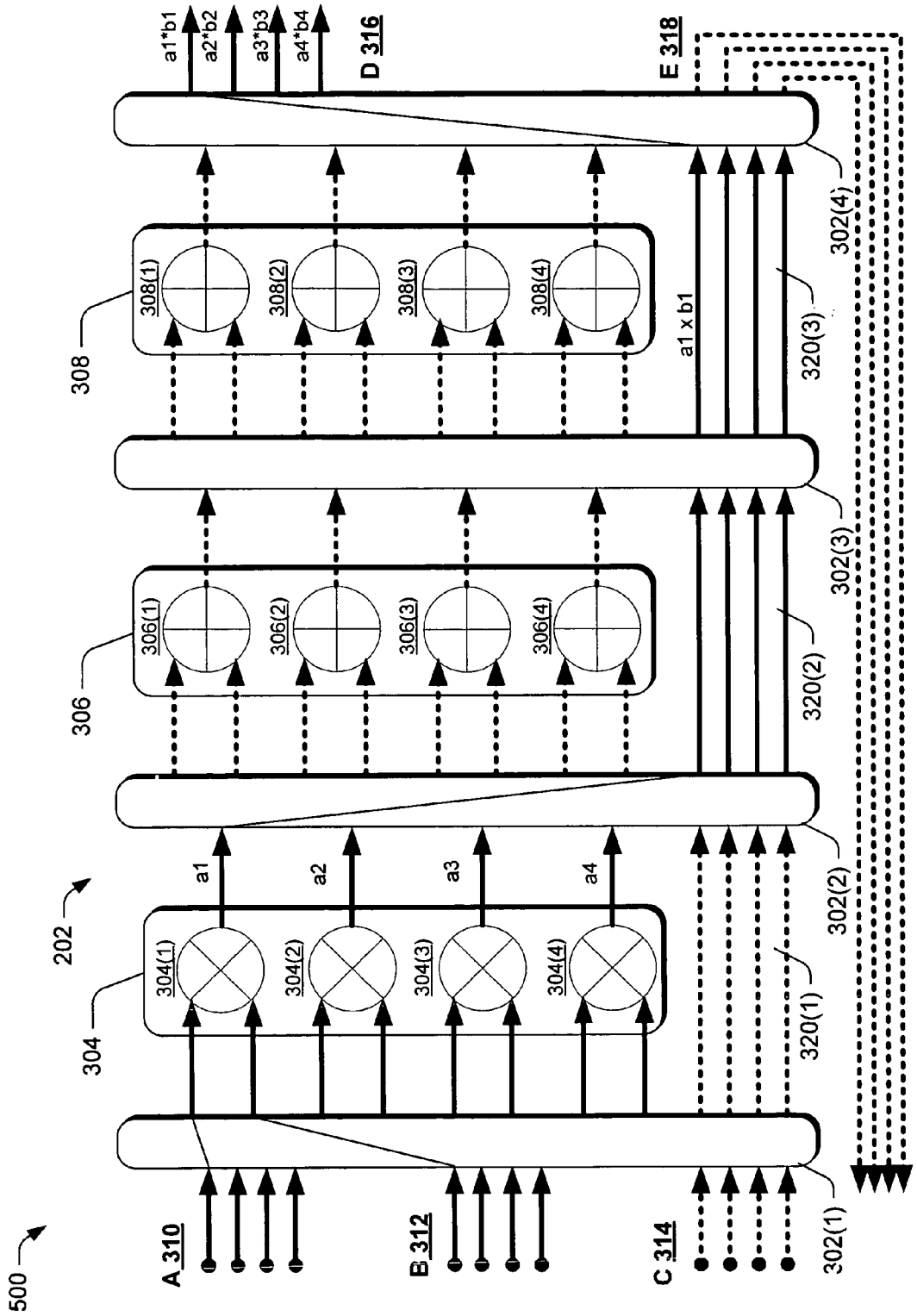

FIG. 5 depicts an exemplary configuration of combined FFT/Matrix 202 to perform a parallel scalar multiplication. It is possible to perform four parallel scalar multiplications in a single iteration. The operation may be according to the formula:

$$D_{4\times 1} = \begin{bmatrix} a_1 \cdot b_1 \\ M \\ a_4 \cdot b_4 \end{bmatrix}$$

In this case "C" inputs 314 are unused and "A" inputs 310 and "B" inputs 312 are fed to multiplier portion 304. Elements a1 and b1 are input to multiplier 304(1); a2 and b2 to multiplier 304(2); a3 and b3 to multiplier 304(3); and a4 and b4 to multiplier 304(1). Both addition potions 306, 308 are bypassed. Again, the control module 204 may operate to determine for a particular configuration which inputs are used, where the arguments are directed, and so forth. Results are produced via multiplication by portion 304 and provided as output "D" 316 via the bypass portion 320(2) and 320(3). A single iteration is used, thus loop outputs "E" 318 are deactivated. Bypass portion 320(1) is also deactivated. The parallel scalar multiplication may be used for channel equalization, transmit coefficient pre-coding (e.g., in beamforming and/or MIMO), digital filtering of signal, and so forth.

Figure 6:
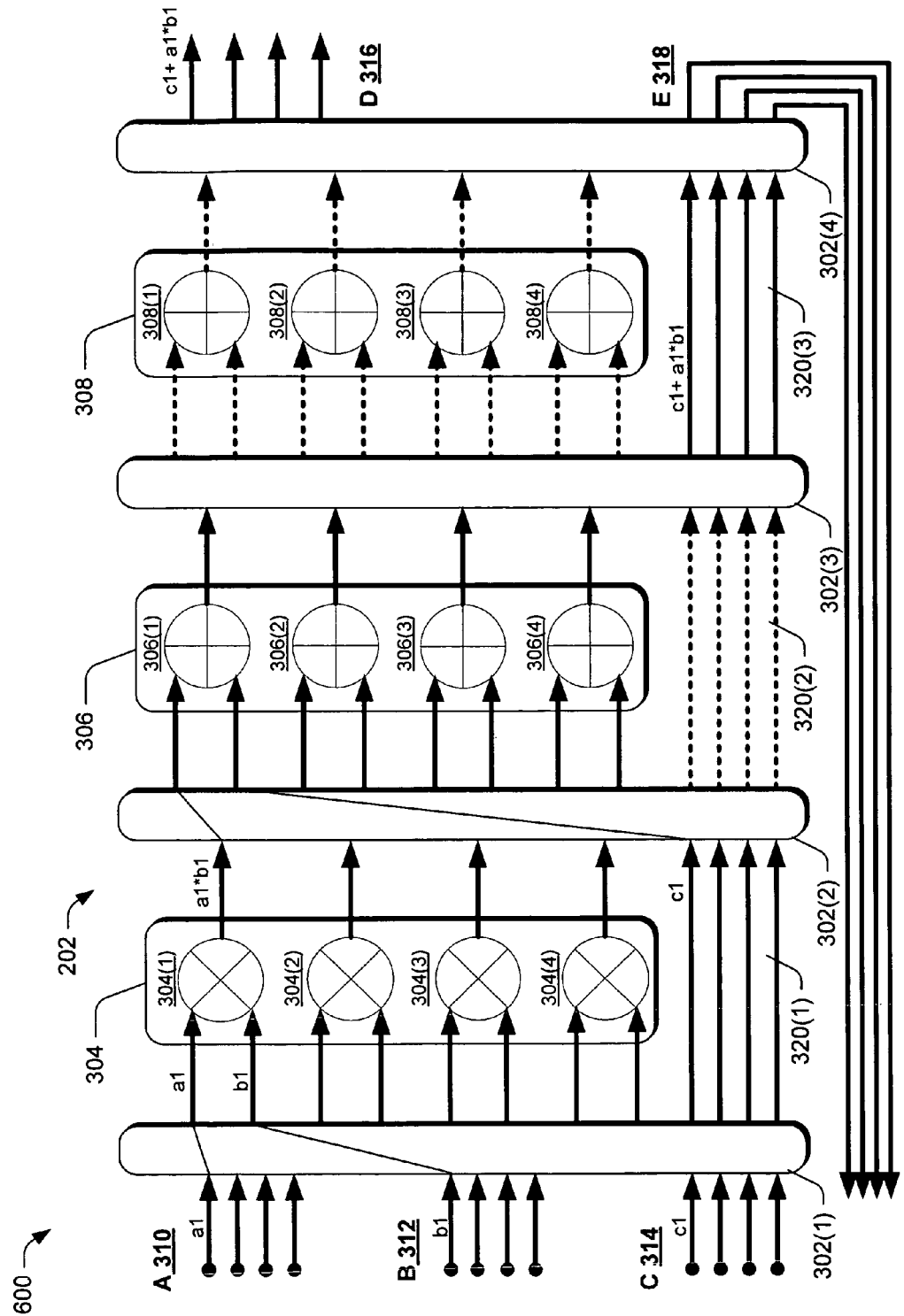

FIG. 6 depicts an exemplary configuration of combined FFT/Matrix 202 to perform a parallel cumulative multiplication-addition operation. The operation may be according to the formula:

$$D_{4\times 1} = \begin{bmatrix} c_1 + a_1^1 \cdot b_1^1 \\ M \\ c_4 + a_4^1 \cdot b_4^1 \end{bmatrix} \text{ where}$$

$$C_{4\times 1} = \begin{bmatrix} c_1 \\ M \\ c_4 \end{bmatrix} = \begin{bmatrix} a_1^0 \cdot b_1^0 \\ M \\ a_4^0 \cdot b_4^0 \end{bmatrix}$$

Note that implementation of the formula requires two different iterations. The first iteration calculates the vector C accordingly to the formula. This is similar to parallel multiplication described with respect to FIG. 4. The difference is that in this operation, results are not directed to output "D" 316 but looped back to input "C" 314 via loop outputs "E" 318, which in this instance are activated. The second iteration (shown in FIG. 6) calculates the final results. Thus for element d1, the first pass calculates a1*b1 which is "looped back" as input c1 for the second pass. In the second pass, multiplier portion 304 calculates a1*b1 and then adder portion 306 adds this result to c1 from the first pass. Outputs for each of elements d2, d3, d4 may be similarly determined. Adder portion 308 and bypass 320(2) are deactivated. Of course, additional iterations may be used to perform successive additions, for larger sets of inputs, and so forth. Thus, the results of the second pass may be looped back again for additional computation with the combined FFT/Matrix 202 parallel cumulative multiplication-addition operation as in FIG. 4. The parallel cumulative multiplication-addition operation may be used for beamforming: input stream combining (e.g., adding data from antennas, weighted with coefficients); digital filtering, and so forth.

Figure 7:
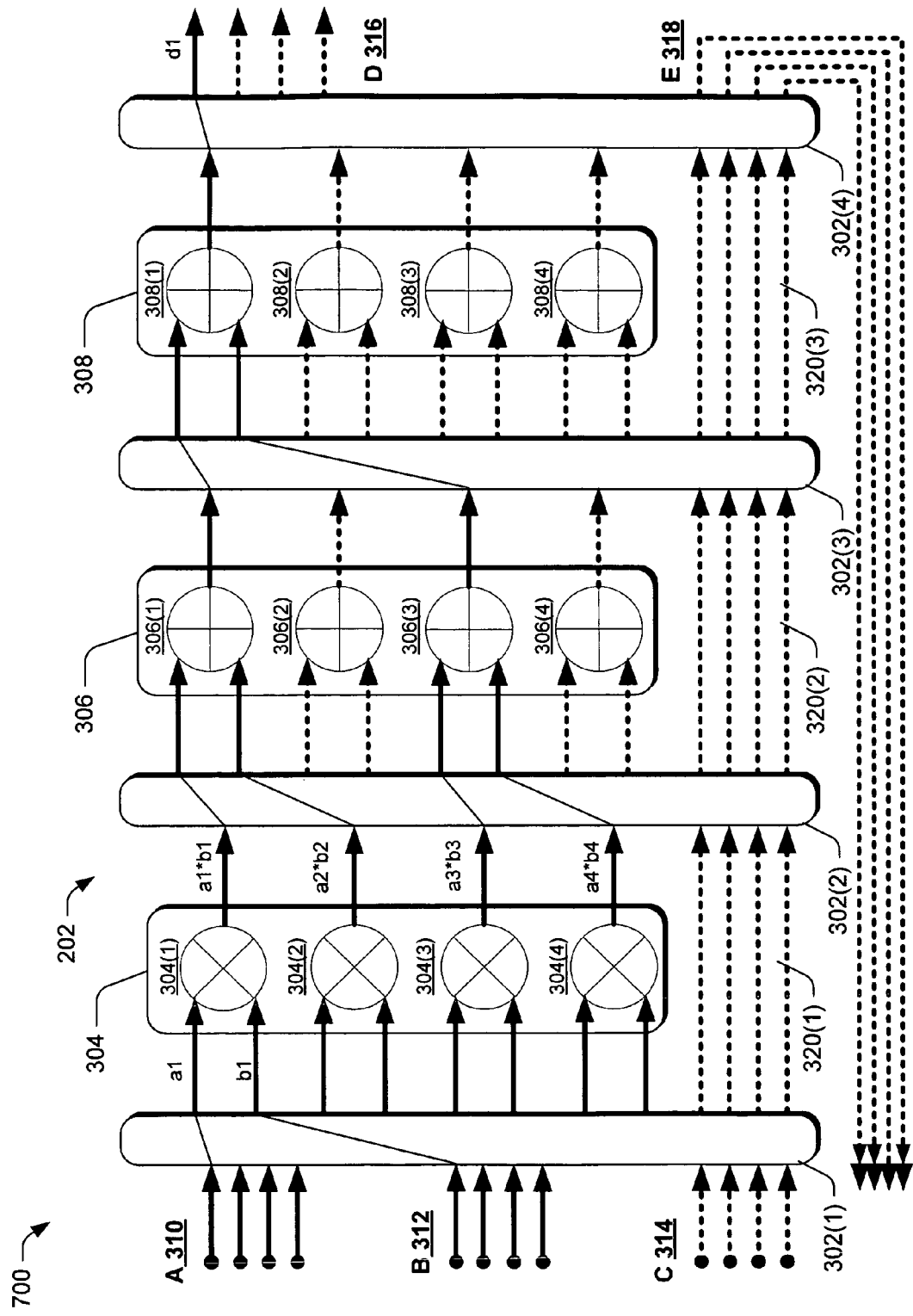

FIG. 7 depicts an exemplary configuration of a combined FFT/Matrix 202 to perform a vector 1×4 and 4×1 multiplication operation. A single iteration is used thus loop "E" 318 is deactivated. "C" inputs 314 are unused as are the bypasses 320(1)-320(3). The operation may be according to the formula:

$$A_{1\times 4} \cdot B_{4\times 1} = [a_1 \cdot b_1 + a_2 \cdot b_2 + a_3 \cdot b_3 + a_4 \cdot b_4]$$

The products a1*b1, a2*b2, a3*b3, a4*b4 are calculated via the multiplier portion 304. Then adder portion 306 operates to perform intermediate additions, such as a1*b1+a2*b2, and a3*b3+a4*b4. Accordingly, when adder 306 has four total adders, two adders may be unused as shown in FIG. 7. Adder portion 308 may then be used to add together the two intermediate results from adder portion 306. This may be accomplished by a single addition. Accordingly, when adder 308 has four total adders, three adders may be unused as shown in FIG. 7. The output "D" 316 thus has one value d1 which equals a1*b1+a2*b2+a3*b3+a4*b4.

Figure 8:
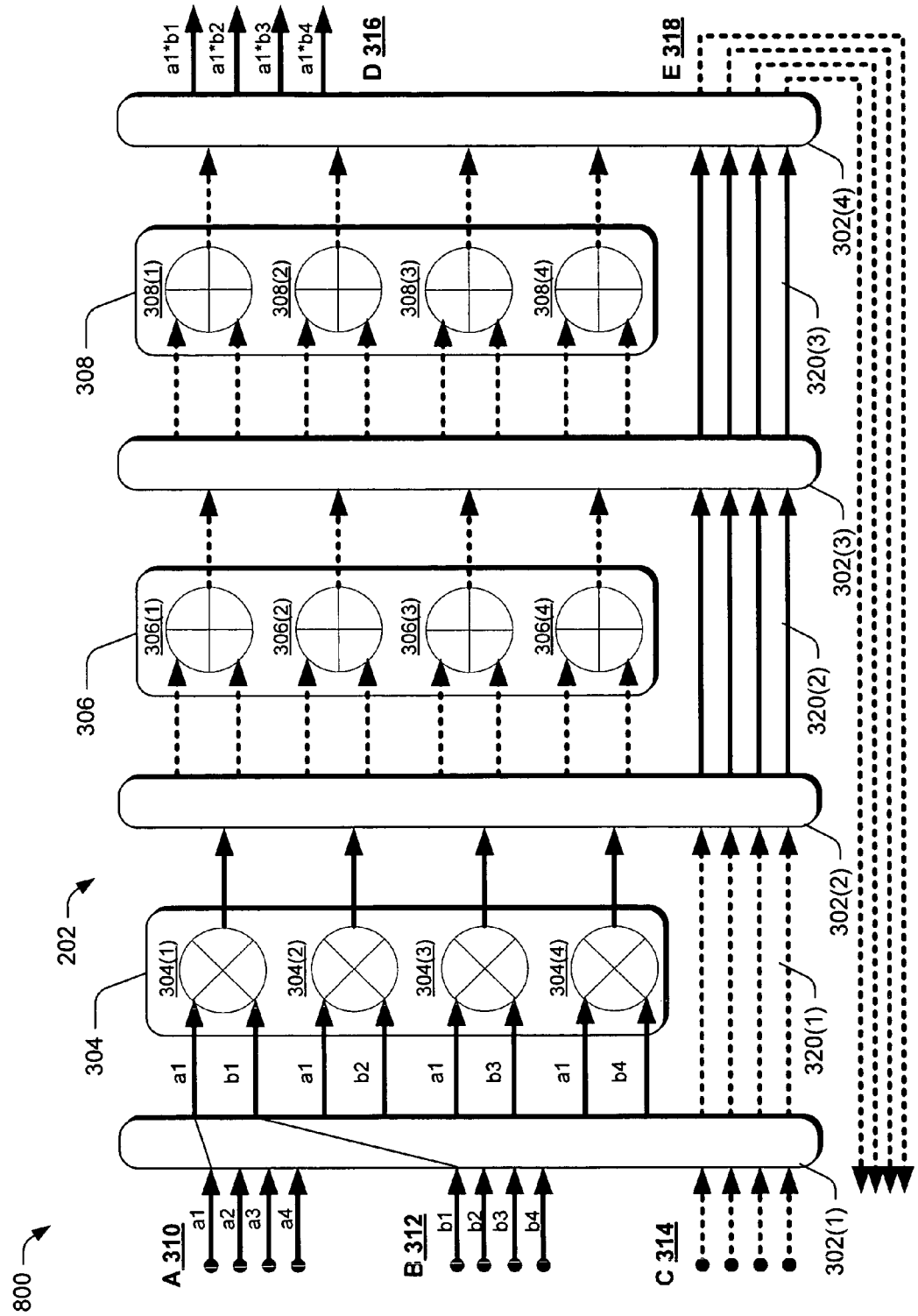

FIG. 8 depicts an exemplary configuration of a combined FFT/Matrix 202 to perform the multiplication of vectors 4×1 and 1×4. The result of this multiplication is a 4×4 matrix. Such operation may be according to the formula:

$$A_{4\times 1} \cdot B_{1\times 4} = \begin{bmatrix} a_1 \cdot b_1 & a_2 \cdot b_1 & a_3 \cdot b_1 & a_4 \cdot b_1 \\ a_1 \cdot b_2 & a_2 \cdot b_2 & a_3 \cdot b_2 & a_4 \cdot b_2 \\ a_1 \cdot b_3 & a_2 \cdot b_3 & a_3 \cdot b_3 & a_4 \cdot b_3 \\ a_1 \cdot b_4 & a_2 \cdot b_4 & a_3 \cdot b_4 & a_4 \cdot b_4 \end{bmatrix}$$

To get this matrix result, four iterations are performed. Each iteration produces a single column vector that is output via the output "D" 316. In this example, a vector B is supplied to input "B" 312 for all four iterations and input via the multiplexer 302(1) to the multiplier stage 304. In an implementation the inputs b1, b2, b3 and b4 are provided to multipliers 304(1), 304(2), 304(3), and 304(4) respectively for each iteration. The vector A is also supplied to the multiplexer 302(1), however, in the first iteration all inputs to the multipliers 304(1)-304(4) are populated by the first element of inputs "A" 310 (a1). FIG. 8 shows the configuration of the first iteration. The products a1*b1, a1*b2, a1*b3, a1*b4 are calculated via the multiplier portion 304. This corresponds to the first column in the formula above. After each iteration, the single column vector calculated may be stored, such as in memory 206 of FIG. 2. In the following iterations, the multiplexer 302(1) may populate the next one of the "A" inputs 310 to the multipliers 304(1)-304(4), e.g., a2, a3, and a4 in successive iterations. The adder portions 306 and 308 are unused and are therefore depicted as inactive in FIG. 8.

Figure 9:
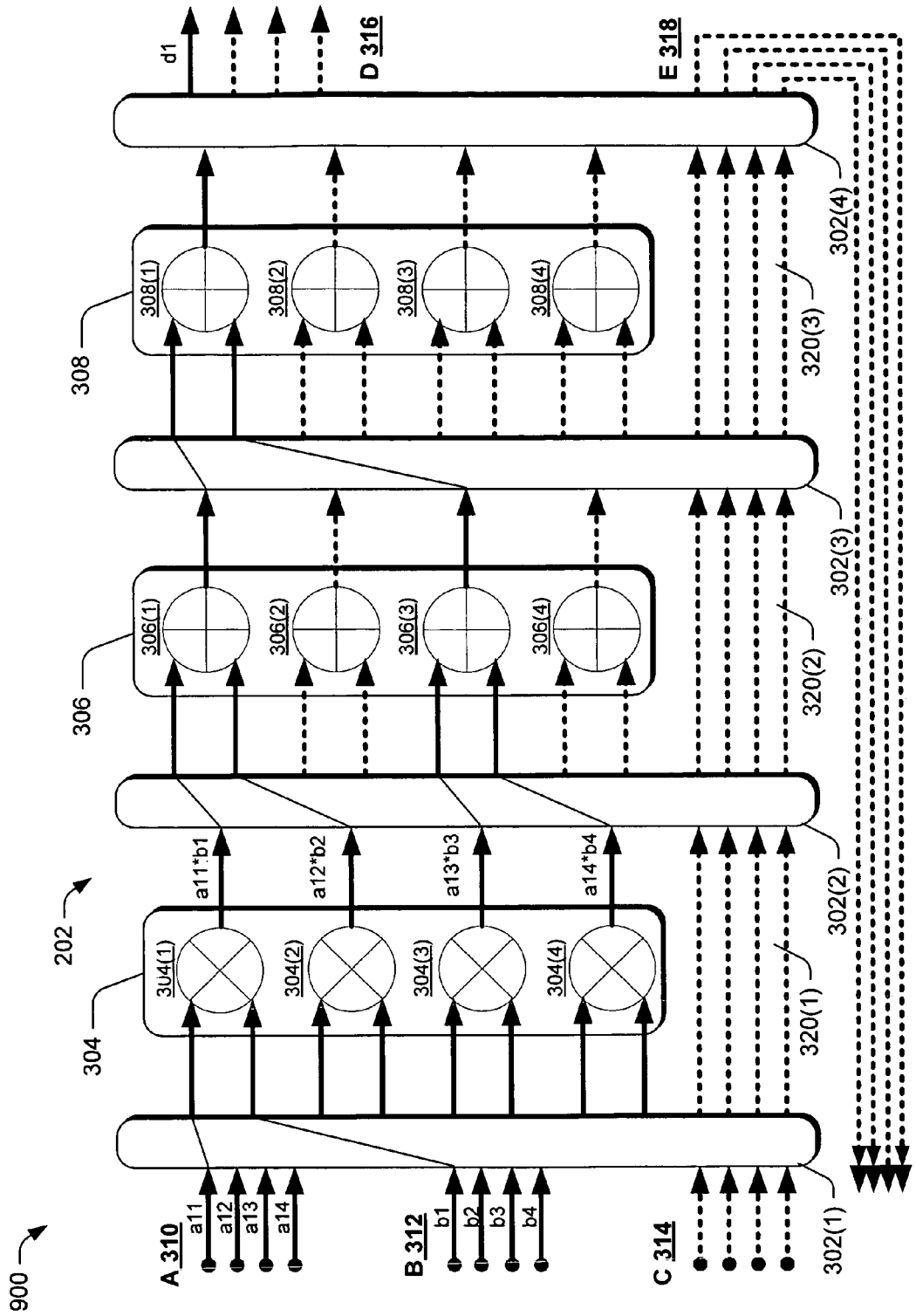

FIG. 9 depicts an exemplary configuration of a combined FFT/Matrix 202 to perform the multiplication of matrix 4×4 and vector 4×1. A product of this multiplication is a 4×1 vector. Four iterations are used to calculate this vector. FIG. 9 shows the configuration for the first iteration. Each iteration produces a single element of the output vector that may be output via the output "D" 316. Therefore, one output (e.g., d1) of outputs "D" 316 is used in a single iteration. The operation may be according to the formula:

$$A_{4\times 4} \cdot B_{4\times 1} = \begin{bmatrix} a_{1,1} \cdot b_1 + a_{1,2} \cdot b_2 + a_{1,3} \cdot b_3 + a_{1,4} \cdot b_4 \\ a_{2,1} \cdot b_1 + a_{2,2} \cdot b_2 + a_{2,3} \cdot b_3 + a_{2,4} \cdot b_4 \\ a_{3,1} \cdot b_1 + a_{3,2} \cdot b_2 + a_{3,3} \cdot b_3 + a_{3,4} \cdot b_4 \\ a_{4,1} \cdot b_1 + a_{4,2} \cdot b_2 + a_{4,3} \cdot b_3 + a_{4,4} \cdot b_4 \end{bmatrix}$$

In the example illustrated in FIG. 9, a vector B with elements b1, b2, b3, b4 is supplied to inputs "B" 312 for all four iterations. However, in the first iteration all inputs in inputs "A" 310 are populated by the first column (having elements a11, a12, a13, a14) of a 4×4 matrix A. The products a11*b1, a12*b2, a13*b3, a14*b4 are calculated via the multiplier portion 304. Then adder portion 306 operates to perform intermediate additions, such as a11*b1+a12*b2, and a13*b3+a14*b4. Accordingly, when adder 306 has four total adders, two adders may be unused as shown in FIG. 9. Adder portion 308 may then be used to add together the two intermediate results from adder portion 306. This may be accomplished by a single addition. Accordingly, when adder 308 has four total adders, three adders may be unused as shown in FIG. 9. The "C" inputs 314 and bypass portions 320(1)-320(3) are also unused and are therefore depicted as inactive in FIG. 9. The output "D" 316 thus has one value d1 which equals a11*b1+a12*b2+a13*b3+a14*b4. This corresponds to the first row in the formula above. In the following iterations, all inputs in inputs "A" 310 are populated by the elements from the next column of the matrix A. Thus, the inputs "A" 310 may be set to a21, a22, a23, a24 for the second iteration; a31, a32, a33, a34 for the third iteration; and a41, a42, a43, a44 for a fourth iteration. The vector multiplication and matrix-vector multiplication operations above may be used for beamforming: per-antenna coefficient calculation; adaptive filters algorithm RLS (Recursive Least Squares); and so forth.

The product of two 4×4 matrixes could be decomposed into four multiplication of a 4×4 matrix and a 4×1 vector. The decomposition is illustrated by the following equation:

$$A_{4\times 4} \cdot B_{4\times 4} = D_{4\times 4}$$

$B_{4\times 4} = [\beta_{4\times 1}^1 \beta_{4\times 1}^2 \beta_{4\times 1}^3 \beta_{4\times 1}^4]$ and $D_{4\times 4} = [\Delta_{4\times 1}^2 \Delta_{4\times 1}^2 \Delta_{4\times 1}^3 \Delta_{4\times 1}^4]$ $\Delta_{4\times 1}^1 = A_{4\times 4} \cdot \beta_{4\times 1}^1$ and $\Delta_{4\times 1}^2 = A_{4\times 4} \cdot \beta_{4\times 1}^2$ and
$\Delta_{4\times 1}^3 = A_{4\times 4} \cdot \beta_{4\times 1}^3$ and $\Delta_{4\times 1}^4 = A_{4\times 4} \cdot \beta^{4\times 14}$ Matrix B and product matrix D could be represented as collections of four column vectors β and Δ respectively. Column vector Δ is a product of matrix A and column vector β multiplication. Therefore, the hardware configuration scheme depicted in FIG. 9 may also be used for multiplication of two 4×4 matrices. This may be accomplished for example by the decomposition of the 4×4 matrices as described and may use sixteen iterations in the configuration of FIG. 9. The multiplication of matrices, such as two 4×4 matrices may be used for MIMO: channel inversions; adaptive filters algorithm RLS (Recursive Least Squares); graphics: vertex geometry transforms (e.g. object movement) and color space conversion; and so forth.

Figure 10:
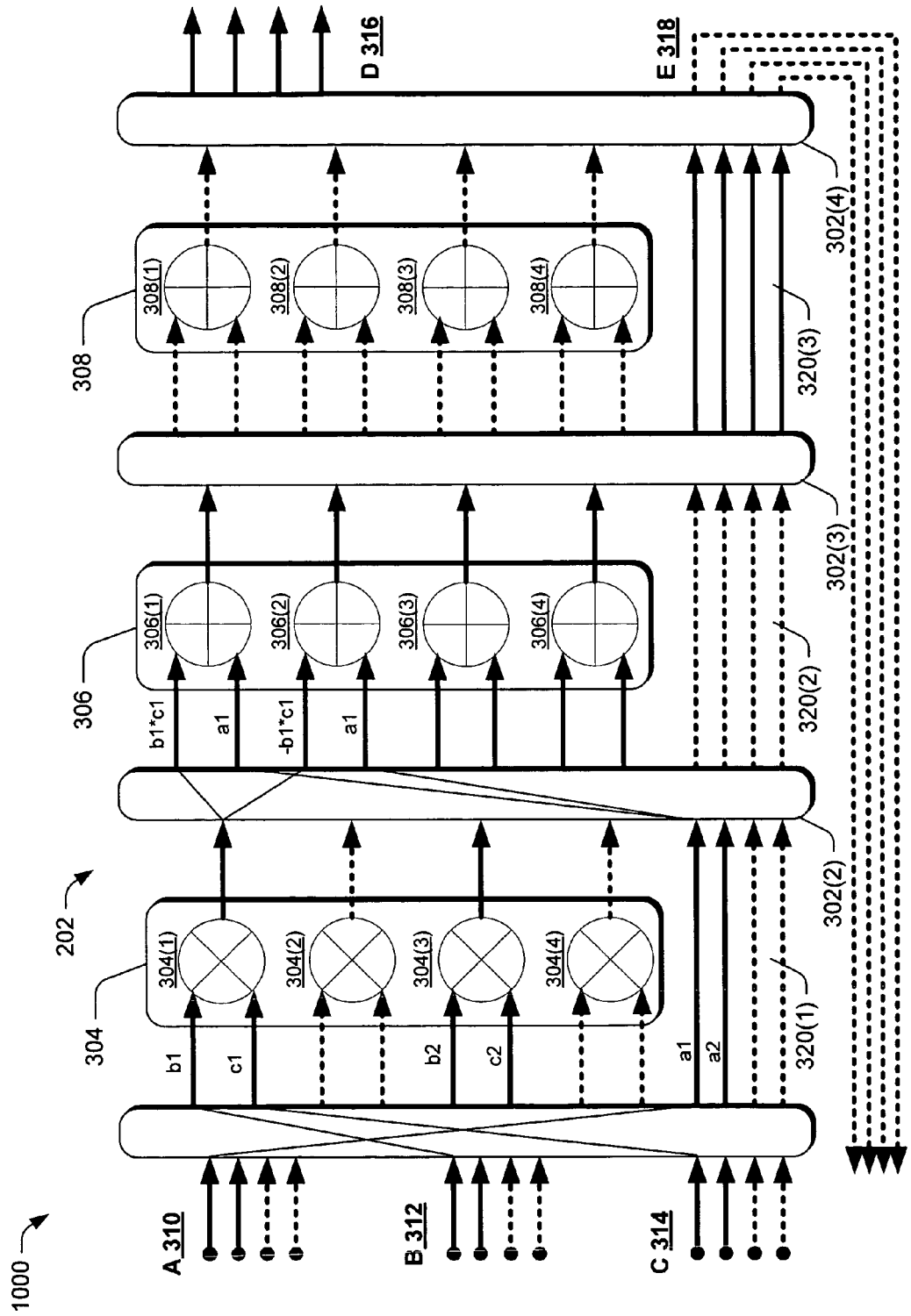

FIG. 10 depicts an exemplary implementation 1000 in which the combined FFT/Matrix circuit 202 is configured to perform FFT via decimation in time Radix-2 butterflies. The combined FFT/matrix circuit 202 may also be configured to execute two decimation in time Radix-2 butterflies in a single iteration. The operation may be according to the formula:

$$\begin{bmatrix} D_1 \\ D_2 \end{bmatrix} = \begin{bmatrix} 1 & C_1 \\ 1 & -C_1 \end{bmatrix} \cdot \begin{bmatrix} A_1 \\ B_1 \end{bmatrix} \text{ and } \begin{bmatrix} D_3 \\ D_4 \end{bmatrix} = \begin{bmatrix} 1 & C_2 \\ 1 & -C_2 \end{bmatrix} \cdot \begin{bmatrix} A_2 \\ B_2 \end{bmatrix}$$

Note that adders may subtract as well. There are two inputs used from each of inputs "A" 310, "B" 312, and "C" 314. Inputs "C" 314 may be used for FFT twiddle factors. To calculate a 1024-point Fast Fourier Transform (FFT), 2560 iterations are used. Input data and twiddle factors are reloaded according to FFT algorithm decomposition. Memory 206 of a hardware accelerator may store twiddle factors and intermediate results of the successive iterations. Having a radix-2 butterfly, it is possible to implement an FFT of each size, e.g. any FFT of general size 2^x where x is any integer.

Figure 11:
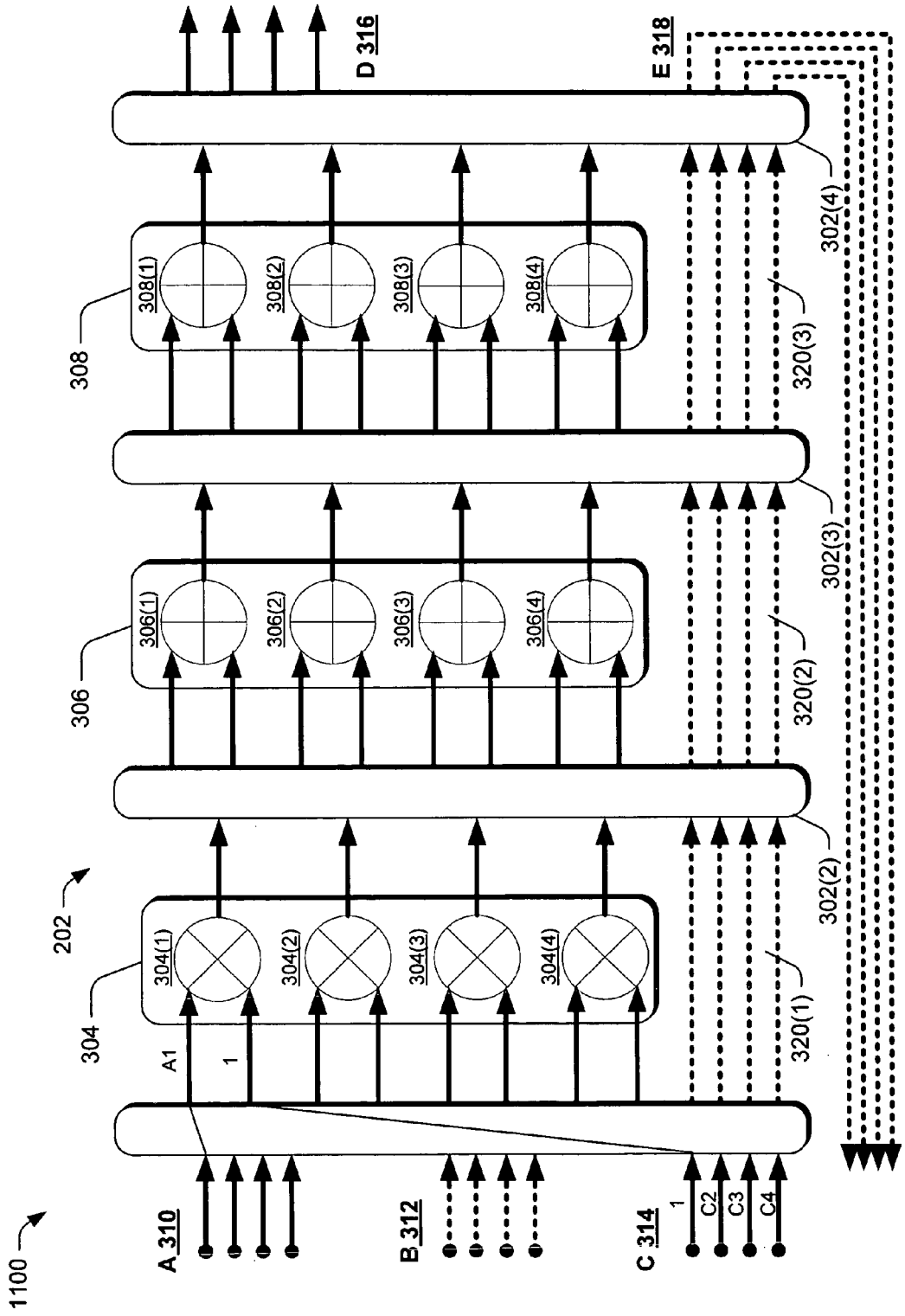

FIG. 11 depicts an exemplary implementation 1100 in which the combined FFT/Matrix 202 is configured to compute FFT via decimation in time Radix-4. Radix-4 butterfly is an efficient technique for 1024-point FFT calculation. The combined FFT/matrix 202 may be configured to compute decimation in time Radix-4 in a single iteration. The operation may be according to the formula:

$$\begin{bmatrix} D_1 \\ D_2 \\ D_3 \\ D_4 \end{bmatrix} = \begin{bmatrix} 1 & 1 & 1 & 1 \\ 1 & -j & -1 & j \\ 1 & -1 & 1 & -1 \\ 1 & j & -1 & -j \end{bmatrix} \cdot \begin{bmatrix} A_1 \\ C_2 \cdot A_2 \\ C_3 \cdot A_3 \\ C_4 \cdot A_4 \end{bmatrix}$$

Inputs "A" 310 and "C" 314 are populated by FFT points and twiddle factors respectively. Note that the twiddle factor on input c1 is equal 1. To calculate a 1024-point FFT, 1280 iterations are used. Again, input data and twiddle factors are reloaded according to FFT algorithm decomposition such as via the memory 206 of FIG. 2. The implementation described with reference to FIGS. 10-11 may be used to perform FFT, inverse FFT, graphics image compression, and so forth. It is noted that the combined FFT/matrix circuit 202 may also perform "split radix" which combines Radix-4 efficiency (e.g., low number of cycles) with Radix-2 scalability (e.g. FFT for powers of 2).

The descriptions above of FIGS. 4-11 show the multiple configurations of a single hardware accelerator 124 having a combined FFT/matrix 202 circuit to provide a variety of complex computations. Such complex computations may for example be used in an SDR implementation, various wireless devices, graphics processing, and a variety of other signal processing devices and applications. For the purposes of example, the size of matrixes and vectors in each of the above examples is four. However, calculations of larger matrixes and vectors are also contemplated. One technique to perform these larger calculations is to use additional parallel units, e.g., to provide additional individual multipliers and adders in the portions 304, 306, 308. For example, the multiplier portion 304 is illustrated having four complex multipliers, additional multipliers may be included, such as having 8, 10, 16 and so forth. Similarly the number of adders in the addition portions 306, 308 may be varied. It is noted that the number of respective individual units in the portions 304, 306, 308 may or may not be equal. Another technique to perform operations on larger sets of input data is increasing the number of iterations. Thus, additional iterations (e.g., passes) through the configurations described in FIGS. 4-11 may be used to perform calculation on larger matrices, vectors, and so on.

Exemplary Procedures

The following discussion describes combined FFT/matrix techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 12:
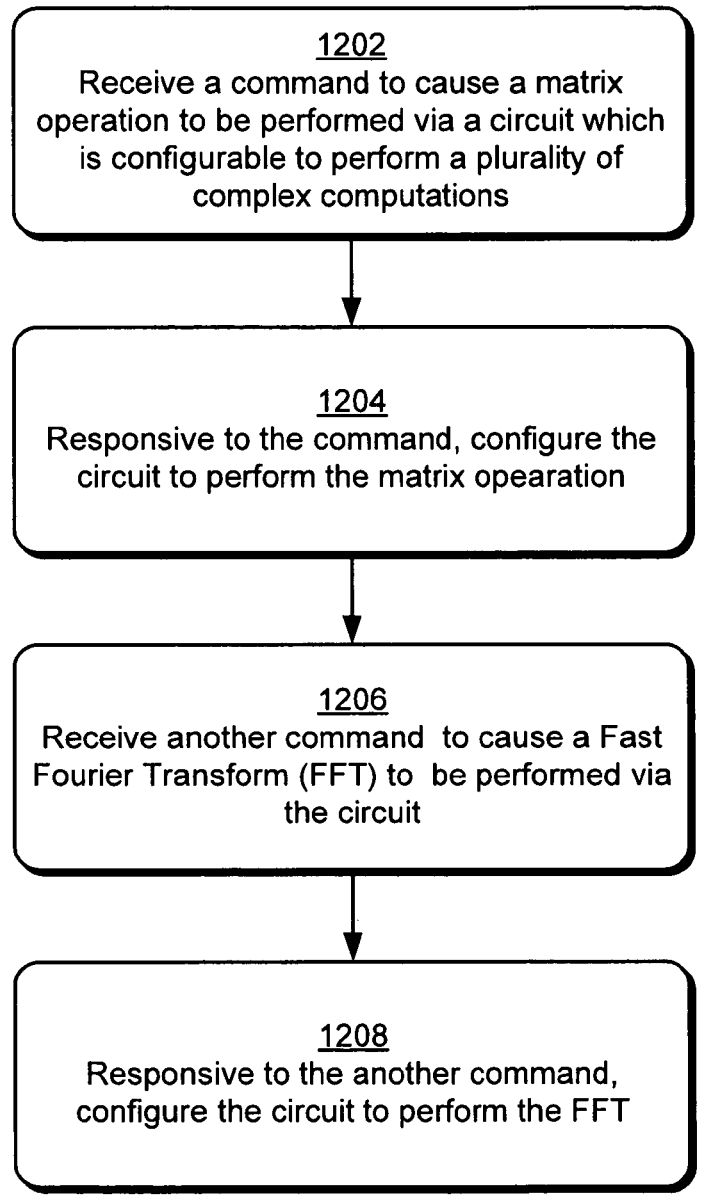
FIG. 12 is a flow diagram depicting a procedure in an exemplary implementation in which a combined FFT/matrix circuit is configured to perform multiple complex computations.

FIG. 12 depicts a procedure in an exemplary implementation in which a combined FFT/matrix circuit 202 is configured to perform multiple complex computations. In block 1202, a command is received to cause a matrix operation to be performed via a circuit which is configurable to perform a plurality of complex computations. For example, referring to FIG. 2 the control module 204 may be executed to manage operation of the hardware accelerator 124 and in particular the combined FFT/Matrix circuit 202 which is configurable to perform at least one matrix operation and Fast Fourier Transforms. A command may be received via the command 218 line which is to cause a particular operation to be performed on associated data. Such commands may be used to cause a variety of configurations of the combined FFT/Matrix circuit 202 to perform different complex computations, such as the numerous examples described in reference to FIG. 4-11. For the purposes of example, assume wireless data received by a receiver 120 as in FIG. 1 via a plurality of antennas is to be combined. The receiver 120 may provide the received wireless data to be processed along with commands (instructions) to the hardware accelerator 124. Control module 204 may execute to process the commands and determine that a matrix operation is specified, such as a vector addition for beamforming (e.g., combining the antenna signals) as described in reference to FIG. 4. A variety of other examples are contemplated. Naturally, receiver 120 is used by way of example and not limitation and it is contemplated that commands and data for command 218 signals and input data 212 of a hardware accelerator 124 may be provided from a variety of components.

In block 1204, the circuit is configured to perform the matrix operation in response to the command. Continuing the preceding example, control module 204 in response to commands from the receiver 120, may configure the combined FFT/Matrix circuit 202 to perform the particular operation specified. The control module 204 for instance may direct the inputs 310, 313, 314 and multiplexers 302(1)-302(3) as illustrated in FIG. 3 such that the selected vector operation of FIG. 4 may be performed on the wireless data. Results via outputs 316 may then be provided to the receiver 120 and/or to another component of the environment 100 to be utilized or further processed.

In block 1206, another command is received to cause a Fast Fourier Transform (FFT) to be performed via the circuit. Again the control module 204 of FIG. 2 may receive a command to process associated data, by performing a FFT. To keep with the preceding example, a receiver 120 may provide a command to the hardware accelerator 124 specifying a FFT to be performed. For instance, a FFT may be specified for a conversion of the data received via the network 106 by the receiver, such as a conversion of the data from time domain to frequency domain via the signal processing device 116 of FIG. 1.

In block 1208 the circuit is configured to perform the FFT in response to the command. Again, control module 204 in response to commands from the receiver 120, may configure the combined FFT/Matrix circuit 202 to perform the particular operation, in the above example an FFT for conversion of analog data to digital. Twiddle factors for the FFT may be pre-loaded in memory 206 or may be obtained by the control module 204. A variety of FFT operations may be specified. Thus, in different cases the control module 204 may in response to a received command set the combined FFT/Matrix circuit 202 to perform FFT via decimation in time Radix-2 butterflies as in FIG. 10 or to perform FFT via decimation in time Radix-4 butterfly as in FIG. 11. The specified FFT may then be performed on the associated data via the combined FFT/Matrix circuit 202.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus comprising:
    a circuit configurable among a plurality of configurations to perform a plurality of complex computations on input data, wherein the circuit includes:

a multiplier portion having a plurality of complex multipliers;

one or more addition portion each having a plurality of complex adders; and one or more multiplexers operable via the control module to configure the circuit to perform a selected one of the plurality of complex computations; and a control module operable to select from the plurality of configurations of the circuit, wherein in a first said configuration the circuit is to perform a matrix operation and in a second said configuration the circuit is to perform a Fast Fourier Transform (FFT).

2. An apparatus as recited in claim 1, wherein the matrix operation is selected from the group consisting of:
vector addition;
parallel scalar multiplication;
parallel cumulative multiplication-addition;
vector multiplication; and
matrix multiplication.

3. An apparatus as recited in claim 1, wherein the Fast Fourier Transform includes an operation selected from the group consisting of a radix-2 butterfly operation, a radix-4 butterfly operation, and a split radix operation.

4. An apparatus as recited in claim 1, wherein:
the circuit is included in a network interface device which is to provide a connection to a network, and
the input data for the circuit is to be received via the network.

5. An apparatus as recited in claim 4, wherein the network interface device is configured to provide a connection to a wireless network.

6. An apparatus as recited in claim 1, including a receiver to receive the input data via a wireless network, such that the circuit is to perform operations on the input data for communications via the wireless network.

7. An apparatus as recited in claim 1, wherein the circuit is included in a graphics processor.

8. An apparatus comprising a hardware accelerator having a circuit which is configurable in a plurality of configurations to perform a plurality of complex computations including at least one configuration to perform a matrix operation and at least another configuration to perform a Fast Fourier Transform, wherein the plurality of complex computations include at least:
vector addition;
parallel scalar multiplication;
parallel cumulative multiplication-addition;
vector multiplication;
matrix multiplication;
Fast Fourier Transform via a radix-2 butterfly; and
Fast Fourier Transform via a radix-4 butterfly.

9. An apparatus as recited in claim 8, wherein the hardware accelerator is to form a portion of a network interface device configured to provide a connection to a wireless network.

10. An apparatus as recited in claim 8, wherein the circuit includes:
a plurality of inputs;
a plurality of computation stages including a multiplier stage and at least one addition stage, each of the computation stages having a plurality of outputs; and a plurality of multiplexers operable to selectively route the plurality of inputs and the plurality of outputs through the plurality of computation stages to perform the plurality of complex computations.

11. An apparatus as recited in claim 10, wherein the multiplier stage comprises four complex multipliers.

12. An apparatus as recited in claim 10, wherein the multiplier stage comprises four complex multipliers and each addition stage comprises four complex adders.

13. An apparatus as recited in claim 10 having two addition stages.

14. An apparatus as recited in claim 10, wherein the plurality of multiplexers are operable via a control module to select a configuration of the plurality of computation stages to perform a corresponding one of the plurality of complex computations.

15. A method comprising:
receiving a command to cause a matrix operation to be performed via a circuit which is configurable to perform a plurality of complex computations, wherein the complex computations which the circuit is configurable to perform include at least: vector addition, parallel scalar multiplication, parallel cumulative multiplication-addition, vector multiplication, matrix multiplication, Fast Fourier Transforms via a radix-2 butterfly, and Fast Fourier Transforms via a radix-4 butterfly;
responsive to the command, configuring the circuit to perform the matrix operation;
receive another command to cause a Fast Fourier Transform (FFT) to be performed via the circuit; and
responsive to the another command, configure the circuit to perform the FFT.

16. A method as described in claim 15, wherein the circuit includes:
a multiplier portion having a plurality of complex multipliers;
one or more addition portion each having a plurality of complex adders; and
one or more multiplexers to configure the circuit to perform the plurality of complex computations.

17. A system comprising:
a circuit configurable among a plurality of configurations to perform a plurality of complex computations on input data, wherein the plurality of complex computations which the circuit is configurable to perform includes at least: vector addition, parallel scalar multiplication, parallel cumulative multiplication-addition, vector multiplication, matrix multiplication, Fast Fourier Transforms via a radix-2 butterfly, and Fast Fourier Transforms via a radix-4 butterfly;
a control module operable to select from the plurality of configurations of the circuit, wherein in a first said configuration the circuit is to perform a matrix operation and in a second said configuration the circuit is to perform a Fast Fourier Transform (FFT); and
a dynamic random access memory (DRAM) to store data for the complex computations performed via the circuit.

18. A system as described in claim 17 including one or more antennas to receive the input data via a wireless network.

* * * * *